Dec. 31, 1957   C. B. LETTERMAN ET AL   2,818,154
PROPORTIONAL LETTER FEED MECHANISM FOR TYPEWRITING MACHINES
Filed Nov. 29, 1954   3 Sheets-Sheet 1
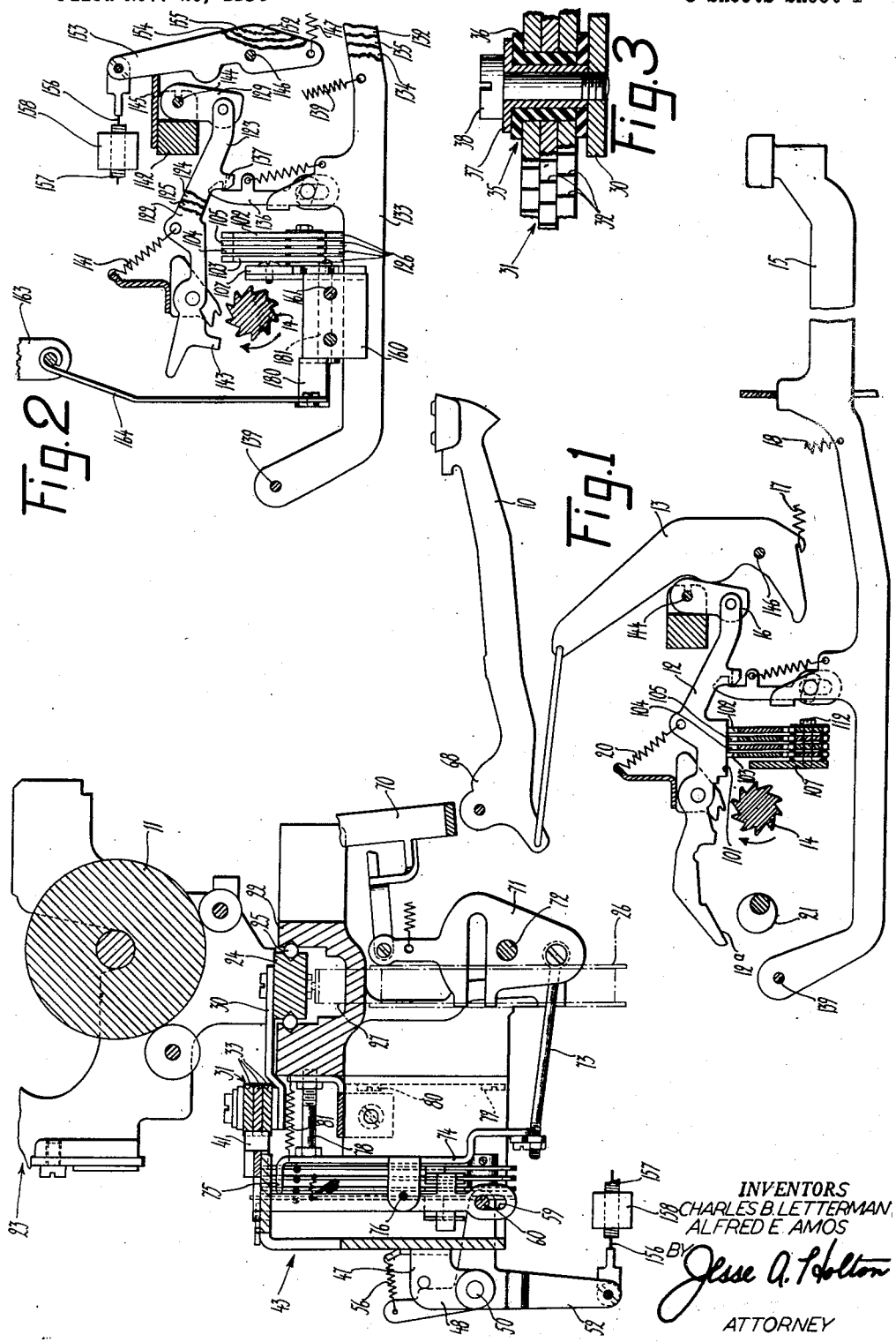
INVENTORS
CHARLES B. LETTERMAN
ALFRED E. AMOS
BY Jesse A. Holton
ATTORNEY

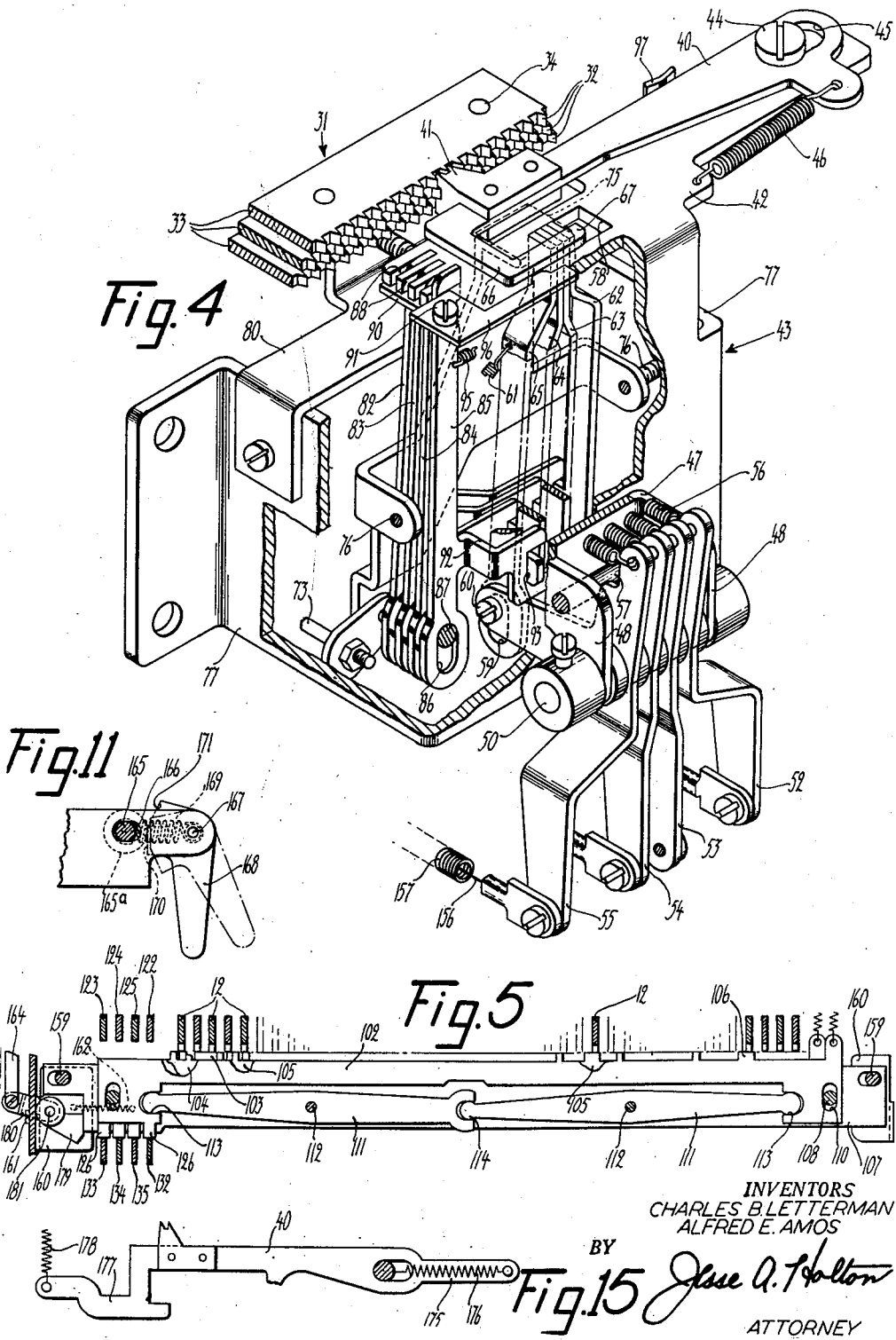

Dec. 31, 1957     C. B. LETTERMAN ET AL     2,818,154
PROPORTIONAL LETTER FEED MECHANISM FOR TYPEWRITING MACHINES
Filed Nov. 29, 1954     3 Sheets-Sheet 3
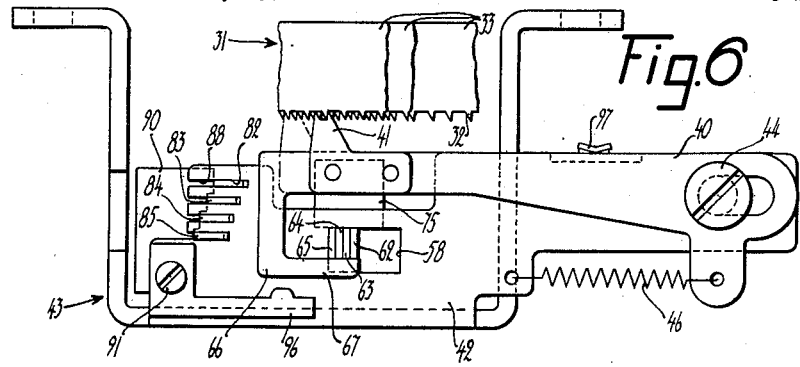
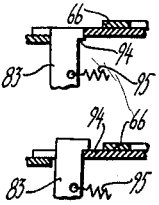
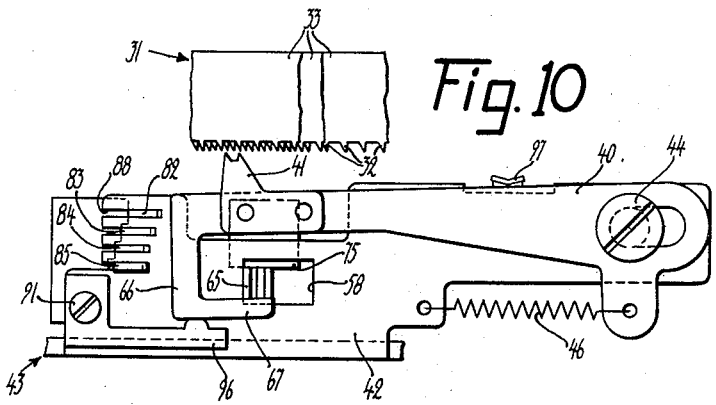
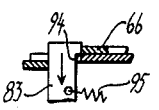
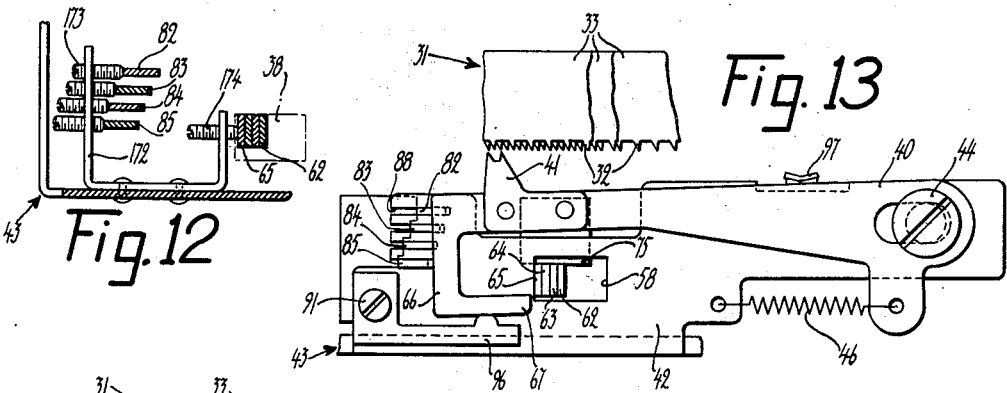
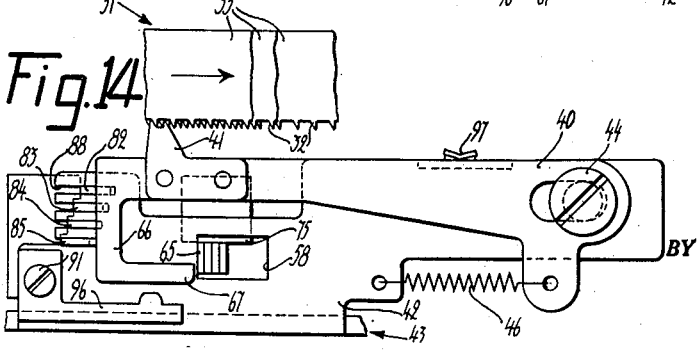
*INVENTORS*
*CHARLES B. LETTERMAN*
*ALFRED E. AMOS*
BY
*Jesse A. Holton*
ATTORNEY

United States Patent Office 2,818,154
Patented Dec. 31, 1957

2,818,154

PROPORTIONAL LETTER FEED MECHANISM FOR TYPEWRITING MACHINES

Charles B. Letterman, West Hartford, and Alfred E. Amos, Windsor, Conn., assignors to Underwood Corporation, New York, N. Y., a corporation of Delaware Application November 29, 1954, Serial No. 471,592

20 Claims. (Cl. 197—84)

This invention relates to proportional letter-feed mechanisms for typewriters and the like.

It is a general object of the invention to provide a proportional letter-feed mechanism which is fast and reliable in operation, of simple and rugged structure, and manufactureable at very low cost.

Another object of the invention, is to provide an efficient proportional feed mechanism embodying a single feed determining stepping dog or dog means which is effectively and simple controlled to feed the carriage proportionally with utmost speed and accuracy.

Another, more specific object is to provide for efficient control for a proportional space controlling dog or dog means which normally is in control over a toothed carriage-operated member, in a manner to effect a reassociation of said dog or dog means with said member for proportional spacing so speedily, accurately and reliably, that no other dog means is required to hold the carriage temporarily while such reassociation takes place.

An additional object is to provide simple manipulative means in association with the featured proportional spacing device whereby the proportional spaces are efficiently and uniformly alterable for expanded spacing.

Also an object of the invention is to provide an efficiently manufactureable feed-rack structure of finely spaced teeth by the association of several coarsely toothed racks in such relation that the teeth thereof are finely interspersed.

A still further object is to provide for differential conditioning of space-determining devices without undue imprint affecting load on the type operating mechanism, by efficient provision of cyclically operative power devices which are variously responsive to the operations of different type actions.

With this and other objects in view, the invention includes certain novel features of construction and combinations of elements, particularly described with reference to the accompanying drawings which illustrate a preferred embodiment of the invention.

Having now more particular reference to the drawings,

Figure 1 is a left-hand sectional side view through the middle of a typewriting machine embodying the proportional letter-feed mechanism of the invention, including a proportional space feed dog, Figure 2 is a left-hand sectional side view showing cyclic power devices which variously are adapted to respond to certain type actions to condition the proportional feed mechanism to yield appropriately sized letter-feed steps, Figure 3 is a rear view of a fragment of a composite feed-rack structure, Figure 4 is a rear perspective view looking down from the right rear side of the machine upon the novel letter-feed or escapement device, including related controlling parts therefor, Figure 5 is a sectional front view showing a series of space-selecting universal bars with related mechanism, Figure 6 is a plan view of the escapement device seen in Figure 4, in normal, carriage holding condition, as viewed looking down from the rear of the machine, Figures 7, 8 and 9 are fragmentary rear sectional views, showing a stop element for an escapement dog respectively in a normal position and two operative positions successively reached, Figure 10 is a plan view similar to Figure 6, the feed dog having been released and being ready to take a positioning movement for determining a proportional feed for the carriage, Figure 11 is a plan view showing an escapement dog a device associated therewith, whereby the feed mechanism of the invention is conditionable at will for expanded proportional spacing, Figure 12 i sa fragmentary plan view showing a modified structure whereby certain operating elements of the proportional spacing device are finely adjustable for accurate feed-determining location, Figure 13 is a plan view similar to Figure 6, showing however the feed dog limitedly moved and ready to re-associate itself with the feed rack, Figure 14 is a view similar to Figure 13, the feed dog having been reassociated with the feed rack and being ready, by limited movement, to restrict the rack for a proportional feed movement, Finally Figure 15 is a plan view of a modified feed dog.

Referring now more particularly to Figure 1, the invention is applied to an Underwood all-electric typewriter which embodies a power typing mechanism of the kind shown in the patent to Yaeger No. 2,254,764, dated September 2, 1941. Said syping mechanism includes many type bars 10 individually swingable against a platen 11 to type at a common typing point. Each type bar 10 is power operable by a cyclic actuator 12 through a train of mechanism comprising an actuator supporting arm 16 and a generally upright sub-lever 13, there being a transverse row of actuators 12 and a transverse row of sub-levers 13. All of said actuators 12 are normally spring-held clear above a toothed power roll 14 and are adapted to be lowered into toothed, motion-receiving relation with said roll, the latter of which rotates constantly in the direction of the arrow when the machine is in use. Key levers 15, one for every actuator 12, are individually operable to connect the actuators 12 selectively with the power roll 14 for single transitory operations, thereby to effect selective power operations of the type bars 10 toward, but short of said platen 11, the type bars printing by momentum. Said actuators 12 end their power strokes when a cam face 12a thereon becomes upwardly deflected by contact with a transverse shaft 21, the latter being mounted eccentrically adjustably to predetermine different lengths of power strokes for varying the typing impact. Springs 17, 18 and 20 bias the parts of the described type action toward their normal positions shown in Figure 1. The stated typing mechanism is supported in a frame-structure which comprises a trackway 22 whereon a carriage 23 is guided for travel, the said carriage having turnably supported thereon the said platen 11. For carriage guiding cooperation in the trackway 22 the carriage includes a channel bar 24, there being usual antifriction elements 25 provided between the trackway 22 and said channel bar.

The carriage 23 is constantly urged in letter-feed direction, that is leftwardly, by a spring motor which is indicated at 26 and has a draw-band connection 27 with the carriage. However, movement of the carriage is subject to the control of a novel proportional letter-feed mechanism which will presently be described.

The proportional feed mechanism is of a design adapted to feed the carriage in varying multiples of definite, fine increments. For example, when the letter "i" is typed the carriage executes a two-increments movement and when the letter "w" is typed, the carriage executes a five-increments movement.

The carriage 23 carries by brackets 30 a composite rack structure having teeth 32 facing rearwardly and spaced lengthwise of the carriage in conformance with the stated fine increments in terms of which the carriage is to be letter fed proportionally to the characters being typed. The said composite rack structure 31 comprises three generally coextensive rack bars 33 fastened together by rivets 34 and each having a succession of coarsely spaced teeth 32, the several racks being so correlated that the teeth of the several racks are interspersed with respect to each other to form a composite rack structure affording lengthwise of the carriage a succession of finely spaced teeth. The composite rack structure, due to the relative coarseness of the teeth on the individual racks 33, is adapted to be manufactured economically and without great difficulty, inasmuch as tools for cutting the teeth will stand up and also because the coarse rack teeth can be hardened with better control. On the other hand, the manufacture of a finely toothed rack entails great difficulties of production, because tools will not stand up and moreover it is extremely difficult to heat-treat appropriately the fine teeth.

The stated composite rack structure 31 is preferably carried at spaced points by the brackets 30 through the medium of a number of resilient mounts 35, see Figures 1 and 3, each such mount comprising a rubber bushing 36 and within the rubber bushing a steel bushing 37. Said rubber bushings 36 fit tightly holes in the composite rack 31 and a top flange on the steel bushing overlies a top flange on the rubber bushing 36. Screws 38 clamp the steel bushings 37 and the rubber bushings down upon the brackets 30, but due to the resiliency of the rubber the rack structure is somewhat yieldable on the carriage whereby excessive shock and noise is avoided when the carriage is being intercepted.

With the composite rack 31 there is associated a feed dog 40 which includes a rack engaging tooth or shoe 41 of hardened steel, sufficiently wide for coaction with the teeth 32 of any one of the several racks 33. The said dog is mounted on a top plate 42 of a frame-supported housing 43, by means of a headed screw or stud 44, the pawl having a slot 45 extending generally parallel to the rack structure 31 to accommodate it on said stud 44. A spring 46 is normally instrumental to swing and hold the dog 40 engaged or meshed with the composite rack 31, as shown in Figures 4 and 6. The same spring 46 exerts an urge also on said dog 40, counter to the direction of letter feed, but the composite rack 31, under the influence of the relatively powerful spring motor 26 of the carriage, forces the dog 40 in the carriage feed direction to the limit allowed by one end of the slot 45 as clearly indicated in Figure 6 and also evident from Figure 4.

Incidental to each operation of a type key causing an operation of a type bar 10, the feed dog 40 is actuated rearwardly free of the rack teeth 32 as seen in Figure 10, to move under the influence of the spring 46 counter to the letter feed direction of the carriage. The extent of dog movement is appropriately controlled in a manner to be explained hereinafter, and finally the dog 40 will reengage or remesh with the rack structure 31. Novel and reliably operative control mechanism is provided for said dog 40 to assure in conjunction with each typing operation its appropriate and accurate reassociation with the rack for the dog, by being carried along by the rack 31 to limitedly letter-feed-step the carriage. The stated movement of the dog 40, under the urge of the spring 46 and counter to the letter feed direction, occurs very rapidly while the carriage 23 stands still, it being understood that at the time the dog is released the carriage is at rest and due to its inertia will remain so for a small interval of time, and in fact long enough until the dog is reengaged.

The mechanism for releasing the dog 40 from the rack teeth 32 and controlling it for appropriate extent of movement, free of the rack teeth 32 and counter to the feed direction of the carriage, will now be described. At the rear of the dog supporting housing 43 there is carried, see Figures 1 and 4, a bracket 47 having spaced ears 48 supporting a rod 50. Upon the latter there are carried for individual pivotal movement a series of bell cranks 52, 53, 54, and 55. The bell crank 52 becomes operated anticlockwise of Figure 1 (clockwise of Figure 4) any time a type action for typing a two-increments character is rendered active. Similarly, the bell cranks 53, 54 and 55 are operated when respectively type actions for typing characters of three, four and five increments are rendered active. In reference to the numerals designating said bell cranks, the units order digits of such numerals signify the carriage advance to be produced by the operations of each of these bell cranks. The bell cranks 52 to 55, under tension of springs 56, reside normally against a stop rod 57 carried on the bracket 47. From forwardly extending arms of the bell cranks 52 to 55, there are upreaching individual slides 62, 63, 64 and 65 which at the top are accommodated in a rectangular hole 58 of the top plate 42 of the housing 43, normally below the dog 40. The said slides 62 to 65 have slots 59 whereby they have connection upon pins 60 of said bell crank arms. Springs 61 are associated with the individual slides 62 to 65 at a suitable angle thereto, to bias them downwardly, forwardly and rightwardly, in a manner so that considered as viewed from the front of the machine, they lie normally against the front side of the hole 58 and moreover are nested toward the right side of said hole, as is clearly evident from Figures 4 and 6. The slides 62 to 65 rest by the upper ends of their slots 59 on the arms of the bell cranks, and the latter bear forwardly against the rod 57.

The dog 40 has at its swinging end a rearwardly reaching portion 66 ending in a tongue 67 which reaches in the direction of feed of the carriage in front of the upper ends of the slides 62 to 65, the positions of the parts being normally as seen in Figures 4 and 6. Incidental to each operation of a type action, depending on the incremental movement of the carriage required by the operated type, a particular one of the slides 62 to 65 is projected to stand in front of the dog tongue 67. Moreover, any slide 62 to 65 becoming projected is thereafter operated rearwardly under control of the operated type action as such reaches fully operated position. The lateral position of the upper end of the slide 62 with respect to the end of the tongue 67 is such that when the slide 62 is projected and then operated rearwardly, it will, by coaction with said tongue 67, free the dog 40 from the rack 31, causing it to be spring drawn counter to the feed direction free of the rack 31 a controlled distance to reengage the rack 31 two increments in advance of the last engagement. The lateral positions of the other slides 63 to 65 are such that respectively the individual projection and operation thereof rearwardly will produce movements of the dog 40 free of the rack respectively for the dog to reengage the rack, three, four and five increments in advance of the last engagement. It will be noted that the low-order digits in the slide-designating numerals 62 to 65 are indicative of the number of teeth 32 the dog 40 will reengage the rack ahead of the last engagement at the projection and operation of the designated individual slides.

Any slide 62 to 65 becoming projected is operated rearwardly resultant to a last part movement of the operated type bar toward the platen. To this end the type bars have each a heel 68 to strike and displace rearwardly a curved universal bar 70 of conventional construction. The said universal bar 70 is operatively connected with a rocker 71, the latter being pivotally carried along an axis 72 upon a case-shiftable body, not shown, which in a usual manner carries operable thereon the type bars 10 and the universal bar 70. Below the axis 72 the said rocker 71 has a link connection 73 to operate a rocker 74 having an operating ledge 75 universal to the several slides 62 to 65. The said rocker 74 is carried on pivot pintles 76 reaching inwardly from the opposite side walls 77 of the housing 43. Normally the rocker 74, under the influence of a spring 81, is in the position seen in Figure 1, resting forwardly against an abutment screw 78 borne adjustably on a bracket 80 spanning the housing side walls 77 and secured thereto. The housing 43 is rigidly attached by screws 79 to the rear of a frame unit comprising the carriage trackway 22. It is now evident that when any operated type bar 10 approaches the printing point and operates the universal bar 70, the rocker 74 will be operated to swing its ledge 75 rearwardly. Therefore, the projected slide 62, 63, 64 or 65, whichever it may be, is displaced rearwardly, it being understood that the slides are rockable about their lower ends, that is the pins 60, and at their upper ends have room in the hole 58 for rearward displacement. The rearwardly operated slide, by cooperation with the dog tongue 67, controls the feed dog 40 as hereinbefore stated.

The slides 62 to 65 have individually associated for operation therewith, upwardly, stop elements 82, 83, 84 and 85, respectively. Near the bottom these stop elements have slots 86 for sliding accommodation on a stud 87, the latter being carried fast on the rear wall of the housing 43 and having thereon spacers or collars guidingly confining said elements 82 to 85. At their upper ends the said stop elements 82 to 85 are accommodated in open slots 88 provided in the housing top plate 42, a plate 90 secured to the plate 42 in underlying relation by means including a screw 91 closing off the open side of said slots 88. The slots 88 and the plate 90 cooperate to locate the upper ends of the stop elements 82 to 85 in staggered relation lengthwise of the carriage in a manner to constitute variously projectable limits for the portion 66 of the dog 40, and appropriately coordinated with locations of the related slides 62 to 65 so that immediately after the tongue 67 leaves a projected slide, the dog 40 will be caused to reengage the rack 31. Each stop element 82 to 85 is respectively connected to its related slide 62 to 65 by an arm 92 having a fork and tongue connection therewith as at 93. Normally all the stop elements are in the lowered positions seen in Figure 4 and when any one is projected upwardly by the operation of its related slide 62, 63, 64 or 65, a shoulder 94 thereon, see Figure 8, will latch over the top plate 42, springs 95 associated with the stop elements lending them a tendency to latch. Whenever the dog 40 moves free of the rack teeth 32, under control of one of the slides 62 to 65, to a reliably controlled extent, the dog portion 66 strikes finally against the relatingly projected stop element, and in doing so displaces the latter slightly for the shoulder 94 to drop off. Before the stop element fully restores, it is instrumental to gage the travel of the said dog lengthwise of the carriage long enough to cause the dog to engage the rack an appropriate number of teeth in advance of the last engagement. The slides 62, etc., in conjunction with said stop elements 82, etc., provide for accurate control of the dog 40 to reengage the rack as required for each typing operation to measure out thereto the appropriate feed space. The stop element 85 for limiting the longest movement of the dog 40 may be long enough to stand always in the path of the dog portion 66. To prevent the dog 40 from swinging unnecessarily far from the rack teeth 32 there is provided a finger 96 fastened upon the top plate 42 by the screw 91. A lug 97, carried upreaching from the plate 42, in a manner not shown, restrains the dog 40 against excessive forward swinging in the event the rack structure 31, with or without the carriage, is removed from the machine.

The control mechanism for the slide projecting bell cranks 52 to 55 will now be described. There are underlying straight faces 101 of the type action actuators 12 several transverse bars numbered 102, 103, 104 and 105, see Figures 1 and 5. When the machine is in condition for lower case typing, the bar 102 has lugs 106 under such of the actuators 12 which belong to type bars 10 that have two-increments lower-case characters. The other bars 103, 104 and 105 have similar lugs 106 respectively underlying normally actuators 12 for type bars that have three, four and five-increments, lower-case characters. The several transverse bars 102, etc., are guided near their ends for vertical movement on a transverse plate 107, the latter having at opposite ends headed studs 108, and the said bars being slotted, as at 110, for guiding association on said studs.

To constrain the several bars 102, etc., to move transversely to their expanse, bodily, there are provided in association with each, two levers 112 of first order, end to end intermeshing as at 114, and having oppositely reaching arms intermeshing their related bars as at 113. The said levers are pivotally carried upon headed studs 112 projecting rigidly from the plate 107. Washers on the headed studs 108 and 112, maintain the bars 102, etc., along with their related levers 111 in parallel operating planes.

It will now be seen that when any actuator 12 is depressed under control of its key 15 it will through one of the lugs 106 actuate one of the bars 102 to 105 downwardly, the operated bar being constrained by the levers 111 to move bodily transversely of its length. To the left of the transverse row of type action actuators 12, see Figure 5, there are provided four special actuators 122 to 125 which are in train respectively with the aforestated bell cranks 52 to 55. These actuators are pivotally supported by arms 129, and individually selectable into motion-receiving relation with the power roll 14, respectively by the operations of the bars 102 to 105. For this purpose the bars 102, etc., have severally each a lug 126 overlying related actuator-engaging levers 132, 133, 134 or 135. Said levers are alike, and similar to the key levers 15 except that they are cut short and lack keys. They are pivotally carried on a rod 139 on which also the type key levers 15 are carried, and are biased to normal positions by springs 139. Normally the actuators 122 to 125 are all in the position in which the actuator 123 is indicated in Figure 2, springs 141 urging them upwardly away from the power roll 14 and rearwardly to the limit provided by a common supporting bar 142 for the arms 16 and 129. A hook element 136 on each of said levers 132, etc., normally overlies a laterally offset lug 137 on the related actuator 122, etc.

At the downward operation of any of the bars 102, etc., by a type action actuator 12, the related lever 132, 133, 134 or 135 is consequently downwardly operated for its hook element 136 thereon to lower the related actuator into operation-receiving relation with the power roll 14. The lowered actuator, which may be the one numbered 123, is consequently power actuated forwardly by the roll 14 until finally a tail 143 thereon lies in the path of one of the teeth of said roll and consequently will be forced upwardly to disengage the actuator. The so disengaged actuator returns then under the tension of its spring 141 to the normal position seen in Figure 2. It may therefore be said that the actuator executes a transitory cyclic operation consisting of a type action operating stroke and a return stroke. In said operating stroke the actuated lug 137 slides from under the hook 136, permitting the disengagement of the actuator by the tail 143 to ensue independently of the hook 136.

The pendent arms 129 to which the actuators 122, etc., are attached are pivotally supported on a transverse rod 144 which also supports the type action arms 16. In being actuated the said arms 129, after some idle motion, encounter and operate related upstanding levers 152, 153, 154 and 155, the latter normally resting spaced from the arms 129, rearwardly against a common stop plate 145. The stated levers 152, etc., are situated to the left of the type action sub-levers 13 and are carried in closely adjacent relation, pivotally on a fulcrum rod 146 which also carries the type action sub-levers 13. Springs 147 individual to the said levers 152, etc., return them to their normal positions seen in Figure 2.

The said levers 152, etc., are individually connected with the slide operating bell cranks 52, etc., through flexible pull wires 156 accommodated in flexible ducts or casings 157, the ends of the latter being anchored in blocks 158 carried fast upon the framework of the machine.

It will now be evident that at the power operation of any type action, after the type bar 10 has partially moved toward the platen, the proper one of the slides 62 to 65 will be operated by a cyclic operation of one of the actuators 122 to 125, as instituted by the selected type-action actuator acting on one of the bars 102 to 105. Concomitantly with the operation of any of said slides a related stop element 82, 83, 84 or 85 is also operated and will be detained, along with the operated slide, by the latch shoulder 94. Late in the same typing stroke the curved universal bar 70 is operated and actuates the projected slide rearwardly, freeing the dog 40 for a spring-urged travel of appropriate extent, free of the rack bar 31. The carriage 23, although being freed by the dog 40, will remain stationary for a moment by reason of its inertia. The universal bar 70 stays operated long enough to maintain the projected slide 62, 63, 64 or 65 rearwardly displaced long enough until the dog 40 travels free of the projected slide. It will be observed particularly that the reengagement of the dog 40 with the rack 31 ensues automatically and independently of the return of the universal bar 70. This provides for the earliest possible reengagement of the dog 40, amply before the carriage commences to move under the urge of its spring motor 26 after overcoming the inertia. This is important because, as a practical matter, it is infeasible to time the return of the universal bar to follow immediately the positioning movement of the dog 40 early enough before the carriage commences to move.

Whichever stop element 82 to 85 is projected, it will prevent excessive travel of the dog 40 and will cooperate with its related slide to assure the engagement of the dog with the rack 31 in accurate tooth relation for the carriage to execute the required feed step. About the time the engagement is accomplished, the projected one of the stop elements 82 to 85 recedes to idle position under the influence of one of the springs 61, it having received a limited, shoulder-freeing movement by the dog 40 to facilitate this.

Each of the type bars 10 has an upper and lower case character, and in many instances the characters on the same type bar require letter-feed steps of different extents. Accordingly, incident to case shifting, the assembly comprising the transverse plate 107 and the bars 102 to 105, is moved transversely of the machine to place underneath the actuators 12 a different set of lugs 106 that provide for appropriate selection of the actuators 122 to 125 to produce letter-feeds proportional to the upper case characters. The said plate 107, by provision of slots therein, is slidably mounted on studs 159 which are fast on generally U-shaped brackets 160 secured, as at 161, to the opposite side walls of the machine. A spring 162, see Figure 5, urges the plate 107 to occupy normally the position for lower case typing. When a conventional case shift body 163, indicated in Figure 2, is case shifted downwardly to upper case position, a link 164 attached to the left end of such body is moved downwardly and will swing an arm 180 fast on a short shaft 181 downwardly. The latter has pivotal support in the U-shaped bracket 160 at the same side of the machine, and carries a cam arm 179 for action on the plate 107 to displace it rightwardly from the normal position seen in Figure 5. The lugs 126 overlying the levers 132 to 135 are wide enough to be operative with these levers in either position of the plate 107. Obviously, the lugs 106 are appropriately provided on the bar to cause for each lower case and each upper case typing operation the required, proportional feeding step of the carriage.

In Figure 11 a modification is shown whereby the normal position of the dog 40 can be changed at will to produce expanded proportional spacing. Instead of a dog mounting stud 44 being rigidly provided in the top plate 42, a stud 165 is provided slidably fitting a short slot 166 extending lengthwise of the rack structure. On a pivot pin 167 which is fast on the plate 42 there is provided a space modifying lever 168, such lever having a face 170 normally contacted by a flange 165a of the stud 165 under the tension of a spring 169 provided intermediate the stud 165 and the pin 167. Normally the stud 165 has a location as in Figure 11, corresponding with the location of the stud 44 shown in other figures, wherefore the machine provides normally letter-feed spaces of two to five increments. When expanded spacing is desired, the lever 168 is set manually to the dot-and-dash position, wherein a face 171 thereon is presented opposite the stud flange 165a one feed increment closer to the lever fulcrum. The stud under the tension of the stated strong spring 169 becomes thus located one feed increment farther leftwardly as seen from the front of the machine. The positioning movements of the feed dog 40 incidental to each typing stroke are thus one feed increment greater and the feed steps which the carriage resultingly executes are thus also increased by one feed increment.

In Figure 12 a structure is shown whereby the upper ends of the stop elements 82 to 85 are individually and finely adjustable lengthwise of the carriage to lead the dog 40 in proper tooth relation into the rack. The rear wall of the housing 43 has attached thereto a bracket 172 carrying for each of said stop elements an adjustable abutment screw 173. The bracket 172 carries also an abutment screw 174 to appropriately correlate the upper ends of the slides 62 to 65 with the said stop elements, the hole 58 provided in the top plate of the housing being large enough to facilitate the adjustment.

A modified form of the dog 40 is shown in Figure 15, having an extension 175 for attachment of a spring 176 which solely serves to urge the dog counter to the feed direction of the rack. The dog has also an extension 177 having a spring 178 attached thereto to solely urge the dog into mesh with the feed rack. Since these springs 176 and 178 are provided to serve each its particular purpose, they can be selected for the most efficient functioning of the dog.

While the invention has been described with reference to the details shown in the drawings, it is not restricted to the particular construction or method of operation set forth, but it is intended to cover such other modifications or disclosures as may be within the purposes of the improvements or the scope of the following claims:

We claim:

1. In a typewriting machine having a carriage impositively urged in a letter-feeding direction, a letter spacing mechanism for said carriage comprising a composite rack structure comprising a plurality of generally coextensive rack bars having each a row of relatively coarsely spaced teeth and fixedly associated with each other so that the teeth of the various rack bars are evenly and finely interspersed lengthwise of the composite rack structure, and said letter spacing mechanism comprising further a letter-feed escapement associated with the teeth of said composite rack structure.

2. The invention set forth in claim 1, and means including rubber elements to mount said rack structure resiliently to reduce the strain and shock on said finely interspersed teeth.

3. In a typewriting machine having a letter-feeding carriage, in combination, selectively operable typing mechanism to type characters of varying widths, a composite rack structure comprising a plurality of generally coextensive racks having each a row of coarsely spaced teeth and being fixedly associated with each other so that the teeth of said racks are interspersed finely and evenly lengthwise of the composite rack structure, a single feed-dog for intermittent carriage-feeding cooperation with the interspersed teeth of said composite rack structure, and means differentially responsive to said typing mechanism at selective operations thereof to control said dog to feed said composite rack structure varying distances in terms of multiples of said finely spaced, interspersed teeth, generally proportional to the widths of the individual characters that are being typed.

4. In a typewriting machine having a letter-feeding carriage, in combination, selectively operable typing mechanism to type characters of varying widths, a plurality of generally coextensive racks having each a row of coarsely spaced teeth and being fixedly associated with each other so that the teeth of said racks are interspersed to form a composite feed-rack having relatively finely spaced teeth, dog means for intermittent carriage-feeding cooperation with the interspersed teeth of said composite feed-rack, means mounting said dog means for engagement with an disengagement from said composite feed-rack and moreover for movement in feed direction engaged with the composite feed-rack and for movement in the opposite direction free thereof, and means differentially responsive to said typing mechanism at selective operations thereof to control said dog means to feed said composite feed-rack varying distances in terms of multiples of said finely spaced interspersed teeth, comprising means to engage and to disengage said dog means and means responsive to said typing mechanism at selective operations thereof to determine for said dog means movements of different extents in said opposite direction free of said composite feed-rack.

5. In a typewriting machine having a letter-feeding carriage impositively urged in a letter-feed direction, in combination, selectively operable typing mechanism to type characters of varying widths, a plurality of generally coextensive racks having each a row of coarsely spaced teeth and being fixedly associated with each other so that the teeth of said racks are interspersed to form a composite feed-rack embodying lengthwise thereof evenly and relatively finely spaced teeth, means connecting said composite feed-rack with said carriage, dog means normally engaged with said composite feed-rack, means mounting said dog means for engagement with and disengagement from said composite feed-rack and moreover for limited movement in a feed direction engaged with said composite feed-rack and with capacity for movement in the opposite direction free thereof, spring means biasing said dog means into mesh with said composite feed-rack and also counter to the feed direction of the latter, stop means to limit variably the free movement of said dog means, and means differentially responsive to different selective operations of said typing mechanism to condition said stop means differentially and additionally to disengage transitorily said dog means from said composite feed-rack, said dog means first under the bias of said spring means moving to the limit of the conditioned stop means and then moving into engagement with said composite feed-rack, the said carriage and connected composite feed-rack, due to the inertia thereof, remaining stationary while said dog means so moves, whereby thereafter the composite feed-rack and the carriage executes a feed step as permitted by said dog means.

6. In a typewriting machine having a letter-feeding carriage, a toothed feed member having a connection with the carriage and being constantly urged directionally to letter-feed, dog means normally in engagement with said toothed member to hold the carriage in a letter-feed position, means mounting said dog means for engagement with and disengagement from said toothed member and for movement from a home position directionally counter to the direction in which said toothed member is urged, means to bias said dog means into engagement with said toothed member and also to bias it counter to the direction in which said member is constantly urged and with less force, and means to control said dog means to cause it to effect new engagements with said toothed member a variable number of teeth from the said home position in the direction counter to that in which said member is urged, thereby to cause letter-feed steps of the carriage of varying extents, said control means comprising means to disengage said dog means from the toothed member and then to lead it, urged by said biasing means, counter to the letter-feed direction of said member, free of the latter to varied extents to be reengaged automatically with said toothed member under the influence of said biasing means as the end of said free movement is reached.

7. The invention set forth in claim 6, and means operatively associated with said disengaging and leading means to restrict, in conjunction with each selective operation thereof, the travel of said dog means from said home position to slightly more than the extents of travel the said dog means is led free of said member.

8. In a typewriting machine having a letter-feeding carriage, a feed rack having connection with the carriage and being under constant urge to move in a letter-feed direction, a single dog normally in engagement with said rack to hold it in a letter-feed position, means mounting said dog for engagement with and disengagement from said rack and for movement counter to said letter-feed direction from a home position, means to bias the dog into engagement with said rack and also to bias it counter to said letter-feed direction, and means to effect new engagements of said dog with said rack a variable number of rack teeth from said home position counter to the said letter-feed direction, comprising means to release and lead said dog to travel free of said rack, counter to the letter-feed direction, from said home position to definitely varied extents.

9. In a typewriting machine having a letter-feeding carriage, a carriage feed rack having connection with the carriage and being under constant urge to move in a letter-feed direction, dog means normally in engagement with said rack to hold it in a letter-feed position, means mounting said dog means for engagement with and disengagement from said rack and for movement counter to said letter-feed direction from a home position, means to bias said dog means into engagement with said rack and also to bias it counter to said letter-feed direction, and means to effect new engagements of said dog means with said rack a variable number of rack teeth from said home position counter to said letter-feed direction, comprising a series of guiding elements, selectively operable to lead said dog means free of said rack for variable extents of travel counter to said letter-feed direction under the urge of said biasing means.

10. The invention set forth in claim 9, and a stop element individually associated with each guiding element for operation substantially conjointly therewith to restrict the travel of the dog means to slightly more than the said guiding elements lead said dog means.

11. The invention set forth in claim 9, and means associated with said dog mounting means to vary the home position of said dog means.

12. In a typewriting machine having a letter-feeding carriage, the combination with a selectively operable typing mechanism adapted to type characters of varying widths, of a carriage-feed rack having connection with the carriage and being urged in a letter-feed direction, dog means normally in engagement with said rack and moved thereby in said letter-feed direction to a home position, thereby establishing a feed position for said rack, means mounting said dog means for engagement with and disengagement from said rack and for movement counter to said feed direction from the said home position, and return thereto, means to bias said dog means into engagement with said rack and also to bias it counter to said feed direction, and means differentially responsive to different selective operations of said typing mechanism to cause new engagements of said dog means with said rack an appropriate number of rack teeth from said home position for said rack to take feed-steps generally proportional to the particular character being typed, comprising means variably conditionable by the selective operations of said typing mechanism to govern said dog means to move varying distances from its home position with clearance along said rack, and comprising further means to intercept said dog means slightly therebeyond to cause an accurate reengagement of said dog means with said rack in accord with the letter-feed step required for the character typed.

13. In a typewritting machine having a letter-feeding carriage, the combination with a plurality of selectively operable type actions, of a toothed feed member having connection with the carriage and being urged directionally to letter-feed, dog means normally in engagement with said toothed member to hold the carriage in a letter-feed position, means mounting said dog means for engagement with and disengagement from said toothed member, and also for movement from a home position counter to the letter-feed direction of the toothed member, resilient means biasing said dog means to engage said toothed member and also to move it counter to the letter-feed direction of said toothed member, edge-means of limited extent on said dog means generally parallel to the toothed member, a series of guide elements neighboring each other in the direction of the toothed member and projectable individually to lie opposite said edge-means, means operable by all type actions as they print, to operate the projected guide element against said edge-means for disengagement of said dog means, the edge-means being arranged to ride off the variously operated guide elements after different extents of travel of said dog means from the home position, allowing said biasing means to engage said dog means with said toothed member, and means to detain any projected guide element projected until after the edge-means rides off therefrom.

14. In a typewriting machine having a letter-feeding carriage, the combination with a plurality of selectively operable type actions, of a toothed feed member having connection with the carriage and being urged directionally to letter-feed, dog means normally in engagement with said toothed member to hold the carriage in a letter-feed position, means mounting said dog means for engagement with and disengagement from said toothed member, and also for movement from a home position counter to the letter-feed direction of the toothed member, resilient means biasing said dog means to engage said toothed member and also to move it counter to the letter-feed direction of said toothed member, edge-means of limited extent on said dog means generally parallel to the toothed member, a series of guide elements neighboring each other in the direction of the toothed member and projectable individually to lie opposite said edge-means, means operable by all type actions as they print, to operate the projected guide element against said edge-means for disengagement of said dog means, the edge-means being arranged to ride off the variously operated guide elements after different extents of travel of said dog means from the home position, allowing said biasing means to engage said dog means with said toothed member, and a series of intercepting elements for said dog means individually interconnected with said guide elements for projection therewith to intercept and direct said dog means into toothed engagement with said member immediately after said edge-means rides off the projected guide element.

15. In a typewriting machine having a letter-feeding carriage, the combination with a plurality of selectively operable type actions, of a toothed feed member having connection with the carriage and being urged directionally to letter-feed, dog means normally in engagement with said toothed member to hold the carriage in a letter-feed position, means mounting said dog means for engagement with and disengagement from said toothed member, and also for movement from a home position counter to the letter-feed direction of the toothed member, resilient means biasing said dog means to engage said toothed member and also to move it counter to the letter-feed direction of said toothed member, edge-means of limited extent on said dog means, facing the toothed member, a series of guide elements neighboring each other in the direction of the toothed member and projectable individually to lie opposite said edge-means, means operable by all type actions as they print, to operate the projected guide element against said edge-means for disengagement of said dog means, the edge-means being arranged to ride off the variously operated guide elements after different extents of travel of said dog means from the home position, a series of intercepting elements for said dog means individually interconnected with said guide elements for projection therewith to intercept and direct said dog means into toothed engagement with said member immediately after said edge-means rides off the projected guide element, and means to detain any guiding element and related intercepting element until said dog means becomes engaged in the toothed member, comprising a latching shoulder on each intercepting element to hold it and its related guiding element projected until the dog means becomes intercepted.

16. In a proportional spacing typewriter, the combination with a carriage and a toothed member having connection with the carriage, of escapement means associated with said toothed member and comprising a plurality of elements selectively operable to condition it to space the toothed member varying numbers of teeth, type actions to type different characters, continuously operating power means common to the type actions, an actuator means for each type action, connectable transitorily with said power means for a cyclic type action operating operation, several transverse bars associated with said actuator means and having projections whereby each is operable by certain of said actuator means, and several other actuator means, selectively connectable with said power means by the operations of said individual bars, for single cyclic operations to operate the said elements.

17. In a typewriting machine having a letter-feeding carriage, the combination with a series of members which are operable selectively to cause typing of different characters, of a plurality of generally coextensive racks having coarsely spaced teeth and being fixedly associated with each other so that the teeth thereof are interspersed to form a composite feed-rack of finely spaced teeth, means connecting said composite feed-rack for feed movement concertedly with the carriage, dog means normally engaged with said composite feed-rack, means mounting said dog means for engagement with and disengagement from said composite feed-rack and, moreover, for limited movement in a feed direction to a home position and for movement counter to said feed direction free of said composite feed-rack, spring means biasing said dog means into mesh with said composite feed-rack and also counter to the feed direction of the latter, and means differentially responsive to different ones of said members at operations thereof to effect new engagements of said dog means with said composite feed-rack varying numbers of teeth from said home position for said rack to take feed-steps generally proportional to the particular character that is being typed, comprising a series of guide elements selectable to release and guide said dog means for varied movements free of said feed-rack, several means selectively operable by said members, separate actuator means for said elements, a continuously operating power means, and means responsive to the selectively operable means to connect said actuator means selectively with said power means for cyclic operation thereby.

18. In a proportional spacing typewriter, the combination with a carriage and a toothed member having connection with the carriage, of escapement means associated with said toothed member and comprising a plurality of elements selectively operable to condition it to space the toothed member varying numbers of teeth, type actions to type various characters, several transverse bars associated with said type actions and each operable transversely of its length by certain of said type actions, separate actuator means adapted for cyclic operations to operate the said elements, a continuously operating power means, and means differentially responsive to the operations of said transverse bars to engage selectively the said actuator means with the said power means for single cyclic operations thereby, the said bars lying in closely contiguous planes and each having lever means associated therewith and nested in the operating plane thereof to constrain it to move bodily transversely to its length.

19. In a typewriting machine having a carriage constantly urged in a letter-feed direction and having a typing mechanism which is selectively operable to type different characters, a proportional letter-feed mechanism comprising in combination, a member having a succession of teeth, dog means normally in engagement with the teeth of said member and in a home position to hold the carriage against letter-feed advance, means mounting said dog means for engagement with and disengagement from said member, and also with capacity for movement in the general direction of the succession of said teeth from and to said home position respectively when disengaged and engaged wtih said teeth, means biasing said dog means into engagement with said toothed member and also from said home position along the succession of said teeth, edge-means of limited extent on said dog means extending generally along the said succession of teeth, a series of guide elements neighboring each other along the said succession of said teeth for projection individually to lie opposite said edge-means at various points, means universal to said guide elements to operate any projected one thereof against said edge-means to disengage said dog means, different ones of said guide elements, when operated, serving variously in conjunction with said edge-means so that said biasing means is enabled to engage the dog means after different extents of movements free of said teeth from said home position, whereby the carriage is adapted to execute measured feed-steps of different extents, means automatically controlled by the typing mechanism at selective character typing operations in accord with the particular width of the character that is being typed, to project appropriate ones of said guide elements for the carriage to execute feed-steps generally proportional to the characters being typed, said typing mechanism having control over the projecting means for the latter to function before each character is typed, and means to operate said universal means by the typing mechanism to operate any projected guide element.

20. The invention set forth in claim 19, and an intercepting element for the dog means operatively related with each one of the guide elements, each intercepting element being moved incidental to the projection of its related guide element from an idle to an operative position, and being arranged so that when it is operated it will restrict the movement of said dog means, free of said teeth, from said home position under the influence of the biasing means to slightly more than that determined by the projected related guide element.

References Cited in the file of this patent
UNITED STATES PATENTS

| | | |
|---|---|---|
| 2,156,975 | Dodge | May 2, 1939 |
| 2,220,185 | Waite | Nov. 5, 1940 |
| 2,547,449 | Dodge | Apr. 3, 1951 |